(12) United States Patent
Dai et al.

(10) Patent No.: US 9,979,008 B2
(45) Date of Patent: May 22, 2018

(54) METHODS FOR MAKING A SOLID ELECTROLYTE INTERFACE LAYER ON A SURFACE OF AN ELECTRODE

(71) Applicant: GM GLOBAL TECHNOLOGY OPERATIONS LLC, Detroit, MI (US)

(72) Inventors: Fang Dai, Troy, MI (US); Mei Cai, Bloomfield Hills, MI (US); Qiangfeng Xiao, Troy, MI (US); Li Yang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 208 days.

(21) Appl. No.: 14/932,361

(22) Filed: Nov. 4, 2015

(65) Prior Publication Data

US 2016/0141598 A1    May 19, 2016

Related U.S. Application Data

(60) Provisional application No. 62/079,935, filed on Nov. 14, 2014, provisional application No. 62/090,207, filed on Dec. 10, 2014.

(51) Int. Cl.
*C25D 7/00* (2006.01)
*C25D 9/02* (2006.01)
(Continued)

(52) U.S. Cl.
CPC ............ *H01M 4/0452* (2013.01); *C25D 9/02* (2013.01); *H01M 4/0447* (2013.01);
(Continued)

(58) Field of Classification Search
CPC ...................................................... C25D 9/02
(Continued)

(56) References Cited

U.S. PATENT DOCUMENTS 7,060,392 B2   6/2006   Kim
7,081,142 B1   7/2006   Carlson
7,939,198 B2   5/2011   Mukherjee et al.
8,735,002 B2   5/2014   Scordilis-Kelley et al.
(Continued)

FOREIGN PATENT DOCUMENTS

CN   1585186 A    2/2005
CN   102610774 A   7/2012
(Continued)

OTHER PUBLICATIONS

First Office Action for Chinese Application No. 201511035868.6 dated Oct. 11, 2017; 8 pages.

*Primary Examiner* — Brian W Cohen
(74) *Attorney, Agent, or Firm* — Harness, Dickey & Pierce, P.L.C.

(57) ABSTRACT

In an example of the method for making a solid electrolyte interface (SEI) layer on a surface of an electrode, the electrode is exposed to an electrolyte solution in an electrochemical cell. The electrolyte solution includes either i) an organo-polysulfide additive having a formula $RS_nR'$ ($n \geq 2$), wherein R and R' are independently selected from a methyl group, an unsaturated chain, a 3-(Trimethoxysilyl)-1-propyl group, or a 4-nitrophenyl group, or ii) a fluorinated organo-polysulfide additive having a formula $RS_nR'$ ($n \geq 2$), wherein R and R' can be the same or different, and wherein R and R' each have a general formula of $C_xH_yF_{(2x-y+1)}$, where x is at least 1 and y ranges from 0 to 2x. A voltage or a load is applied to the electrochemical cell.

16 Claims, 6 Drawing Sheets

(51) Int. Cl.
*H01M 4/04* (2006.01)
*H01M 10/0567* (2010.01)
*H01M 10/052* (2010.01)
*H01M 4/139* (2010.01)
*H01M 10/04* (2006.01)
*H01M 4/36* (2006.01)
*H01M 4/38* (2006.01)

(52) U.S. Cl.
CPC ......... *H01M 4/139* (2013.01); *H01M 10/049* (2013.01); *H01M 10/052* (2013.01); *H01M 10/0567* (2013.01); *H01M 4/362* (2013.01); *H01M 4/382* (2013.01)

(58) Field of Classification Search
USPC .......................................... 205/50, 235, 317
See application file for complete search history.

(56) References Cited

U.S. PATENT DOCUMENTS

| | | | |
|---|---|---|---|
| 8,753,771 | B2 | 6/2014 | Skotheim et al. |
| 8,871,387 | B2 | 10/2014 | Wang et al. |
| 2014/0001048 | A1* | 1/2014 | Roussel ............... C08J 7/16 205/50 |
| 2014/0170459 | A1* | 6/2014 | Wang ............... H01M 4/5815 429/105 |
| 2014/0255780 | A1 | 9/2014 | Mikhayilk et al. |
| 2014/0272597 | A1 | 9/2014 | Mikhaylik et al. |
| 2016/0020491 | A1 | 1/2016 | Dai et al. |

FOREIGN PATENT DOCUMENTS

| | | |
|---|---|---|
| CN | 104051787 A | 9/2014 |
| CN | 105280953 A | 1/2016 |
| CN | 105609700 A | 5/2016 |
| DE | 102015119522 A1 | 5/2016 |

* cited by examiner

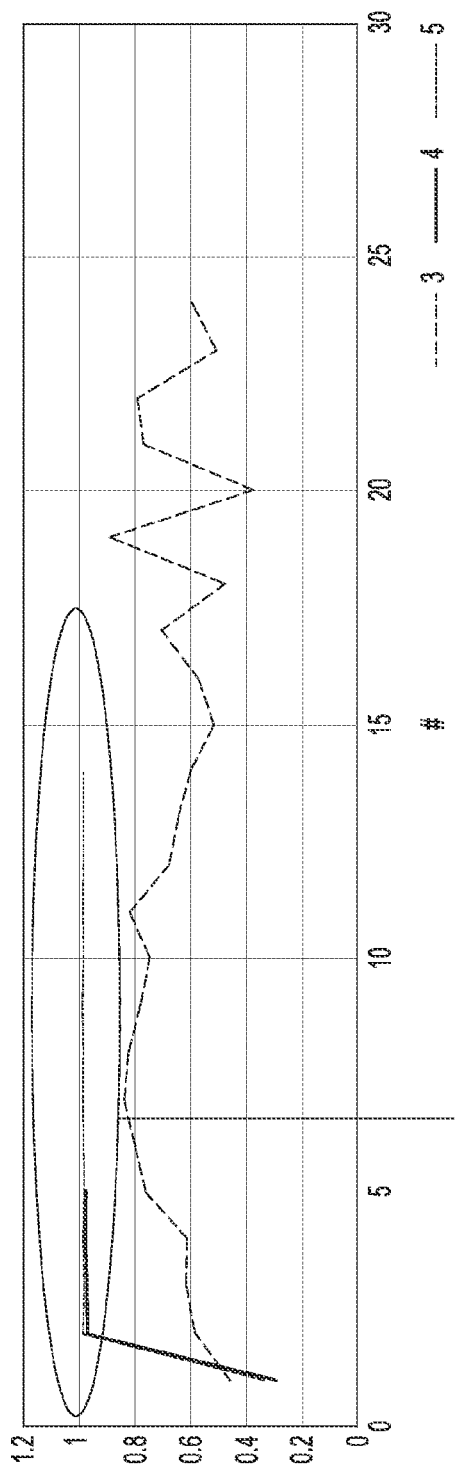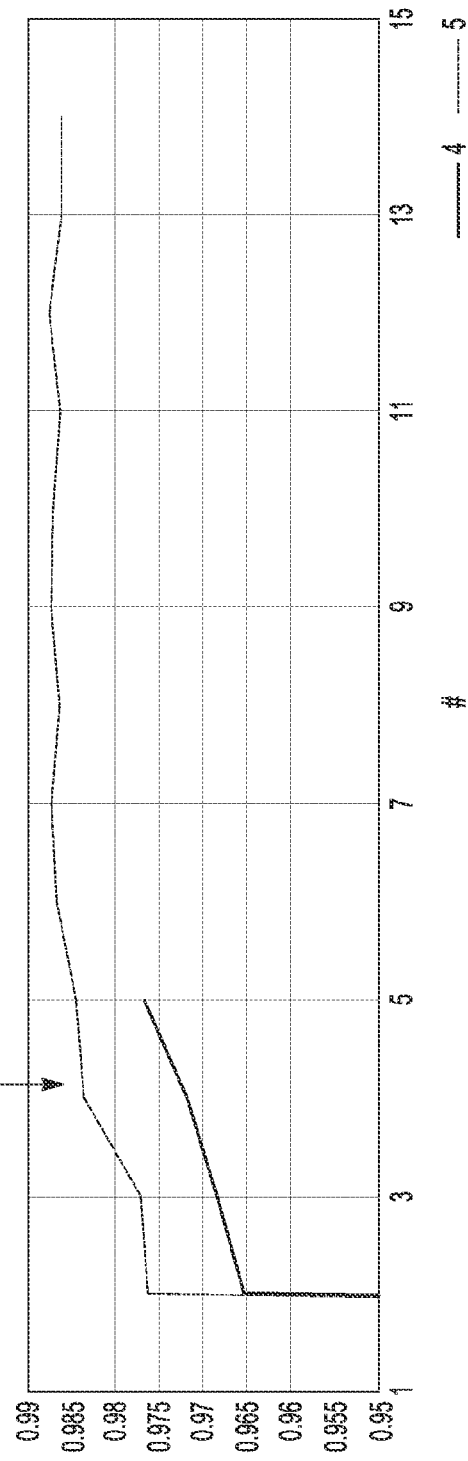
Fig-5A
Fig-5B

METHODS FOR MAKING A SOLID ELECTROLYTE INTERFACE LAYER ON A SURFACE OF AN ELECTRODE

CROSS-REFERENCE TO RELATED APPLICATIONS

This application claims the benefit of U.S. Provisional Application Ser. No. 62/079,935, filed Nov. 14, 2014 and U.S. Provisional Application Ser. No. 62/090,207, filed Dec. 10, 2014, each of which is incorporated by reference herein in its entirety.

BACKGROUND

Secondary, or rechargeable, lithium ion batteries or lithium sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of the method for making a solid electrolyte interface (SEI) layer on a surface of an electrode, the electrode is exposed to an electrolyte solution in an electrochemical cell. The electrolyte solution includes either i) an organo-polysulfide additive having a formula $RS_nR'$ ($n \geq 2$), wherein R and R' are independently selected from a methyl group, an unsaturated chain, a 3-(Trimethoxysilyl)-1-propyl group, or a 4-nitrophenyl group, or ii) a fluorinated organo-polysulfide additive having a formula $RS_nR'$ ($n \geq 2$), wherein R and R' can be the same or different, and wherein R and R' each have a general formula of $C_xH_yF_{(2x-y+1)}$, where x is at least 1 and y ranges from 0 to 2x. A voltage or a load is applied to the electrochemical cell.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 5A is a graph illustrating the Coulombic efficiency (Y-axis) vs. cycle number for coin cells with lithium working electrodes in a comparative electrolyte solution and an example electrolyte solution having an organo-polysulfide additive therein;

FIG. 5B is an exploded portion of the encircled portion of the graph of FIG. 5A;

DETAILED DESCRIPTION

Figure 1:
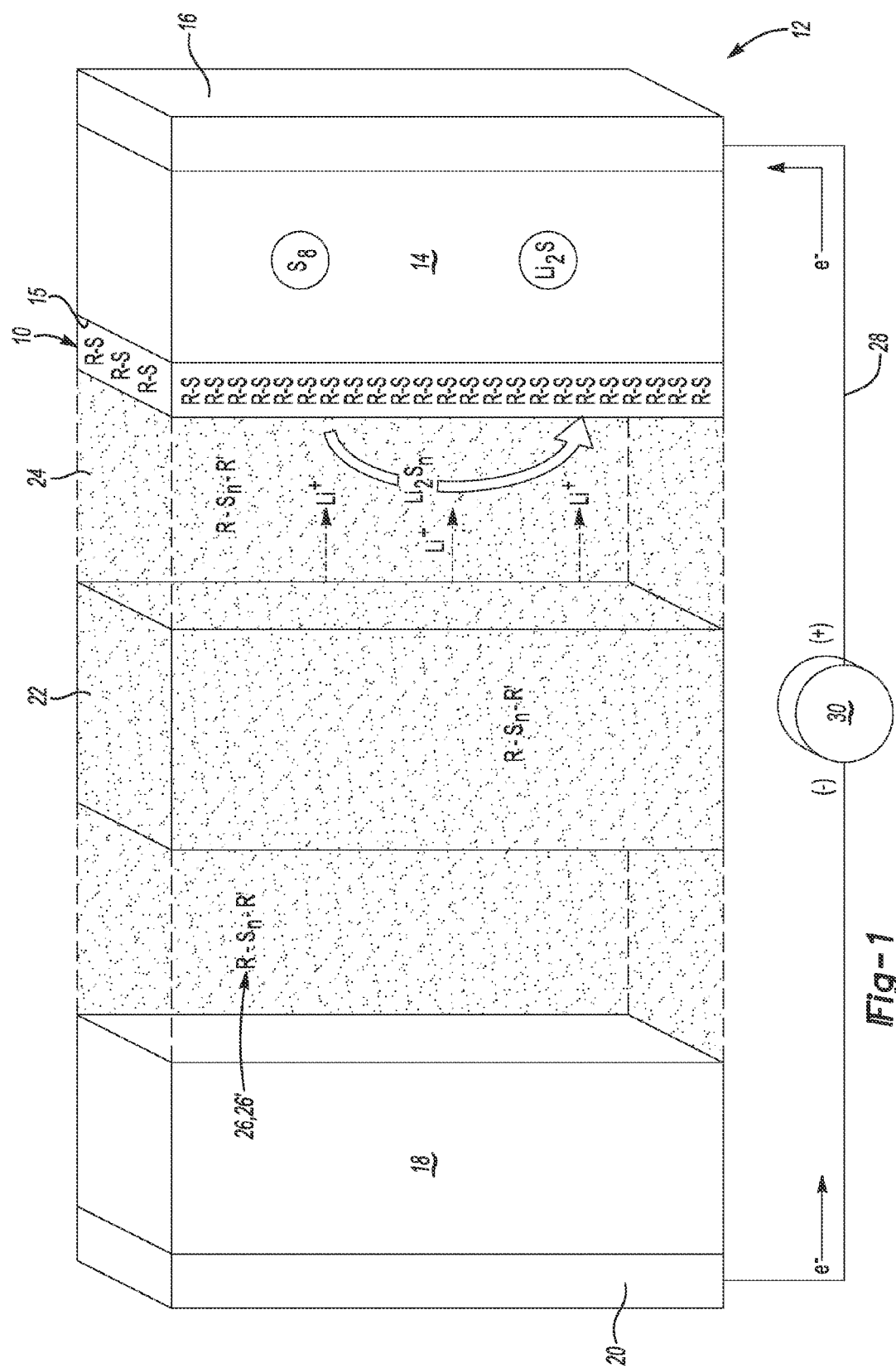
FIG. 1 is a schematic, perspective view of an example of a lithium sulfur battery showing a discharging state and formation of an SEI layer on a positive electrode surface.

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted/intercalated into the negative electrode, and during discharging, lithium ions are extracted from the negative electrode. Each of the electrodes is also associated with respective current collectors, which are connected by an interruptible external circuit that allows an electric current to pass between the negative and positive electrodes. Two examples of lithium-based batteries include the lithium sulfur battery and the lithium ion battery.

Examples of the negative electrode and positive electrode disclosed herein have a solid electrolyte interphase (SEI) layer formed on a surface thereof. This SEI layer is formed from an additive that is present in an electrolyte solution. Since the additive is present in the electrolyte solution, the SEI layer may be formed during a discharge cycle or a charge cycle of an electrochemical cell. As used herein, the electrochemical cell may refer to a lithium sulfur battery, a lithium ion battery, a lithium lithium battery or symmetrical cell, or a half cell with a working electrode and a counter/reference electrode.

In some instances, the coating process of the SEI layer takes place in situ during the discharge cycle or charge cycle of the electrochemical cell. More particularly, the SEI layer forms during a reduction process taking place on the electrode (i.e., electrons are moving toward the electrode through an external circuit). As an example, in a lithium sulfur battery, the discharge cycle may be used to form the SEI layer on the surface of a sulfur-based positive electrode.

As another example, in a lithium ion battery, the charge cycle may be used to form the SEI layer on the surface of a graphite-based or silicon-based negative electrode.

In other instances, the coating process is performed during the formation or preparation of the electrode, prior to being introduced into the final battery in which it will be used. In these instances, the coating process still takes place in situ in the electrochemical cell, but the electrochemical cell is not the final battery. As an example, a half cell may be used which includes the electrode to be coated as a working electrode, as well as a counter/reference electrode. A discharge process in the half cell may be used for coating a graphite-based electrode or a silicon-based electrode. As another example, a lithium lithium battery or symmetrical cell may be used as the electrochemical cell. In this example, one of the lithium electrodes functions as the working electrode and the other lithium electrodes functions as the counter/reference electrode. In these examples, a discharge cycle causes the SEI layer to form on the working lithium electrode.

Each example of the method disclosed herein involves exposing the electrode to the electrolyte solution in a suitable electrochemical cell, and applying a voltage or a load to/across the electrochemical cell, thereby causing the additive to form the SEI layer on the electrode surface. The additive is believed to react with the electrode surface. More particularly, upon exposure to a working voltage, the additive can self-assemble such that sulfur atoms of the additive align along the electrode surface. A bond may be formed between atoms of the electrode (e.g., carbon atoms) and the sulfur atoms of the additive. This forms the SEI layer on the electrode surface.

For some examples of the method disclosed herein, the additive is an organo-polysulfide additive having the formula $RS_nR'$ (n≥2), wherein R and R' are independently selected from a methyl group, an unsaturated chain (e.g., a vinyl group, an allyl group, etc.), a 3-(Trimethoxysilyl)-1-propyl group, or a 4-nitrophenyl group. R and R' may be the same group or a different group. It is to be understood that the unsaturated chain, the 3-(Trimethoxysilyl)-1-propyl group, and the 4-nitrophenyl group will polymerize in situ, and thus some examples of the SEI layer include a polymer layer.

For some other examples of the method disclosed herein, the additive is a fluorinated organo-polysulfide additive having the formula $RS_nR'$ (n≥2), wherein R and R' have the general formula of $C_xH_yF_{(2x-y+1)}$, where x is at least one (e.g., ranges from 1 to 100) and y ranges from 0 to 2x. Some specific examples from which R and R' of the fluorinated organo-polysulfide additive may be independently selected include $CF_3$ (x=1, y=0), $CF_2CF_3$ (x=2, y=0), and $CH_2CF_3$ (x=2, y=2). R and R' may be the same group or a different group. It is to be understood that any of the R and R' groups will polymerize in situ, and thus some examples of the SEI layer include a polymer layer.

The organo-polysulfide additive or the fluorinated organo-polysulfide additive may be added directly into the electrolyte solution in an amount ranging from greater than 0 vol % to about 50 vol % of the total vol % of the electrolyte solution. As specific examples, the organo-polysulfide additive may be included in amounts of 0.5 vol % and 20 vol %. As other specific examples, the fluorinated organo-polysulfide additive may be included in amounts of 0.05 vol % and 20 vol %.

Examples of the method will be discussed herein in reference to each of the types of electrochemical cells that may be used, as different cells may utilize different electrolyte solutions (each of which includes the organo-polysulfide additive or the fluorinated organo-polysulfide additive) and/or electrodes.

Lithium Sulfur Electrochemical Cell (Lithium Sulfur Battery)

In the lithium sulfur electrochemical cell or battery, the SEI layer forms on the positive electrode surface during the discharge cycle. An example of the lithium sulfur electrochemical cell 12 during the discharge cycle is shown in FIG. 1.

The lithium sulfur electrochemical cell 12 includes the positive electrode 14. The positive electrode 14 includes any sulfur-based active material that can sufficiently undergo lithium alloying and dealloying with aluminum or another suitable current collector 16 functioning as the positive terminal of the lithium sulfur electrochemical cell 12. An example of the sulfur-based active material is a sulfur-carbon composite. In an example, the weight ratio of S to C in the positive electrode 14 ranges from 1:9 to 8:1.

The positive electrode 14 may also include a binder material and/or a conductive filler material. The binder material may be used to structurally hold the sulfur-based active material together. Examples of the binder material include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Other suitable binders include polyvinyl alcohol (PVA), sodium alginate, or other water-soluble binders.

The conductive filler material may be a conductive carbon material. The conductive carbon material may be a high surface area carbon, such as acetylene black (e.g., SUPER P® conductive carbon black from TIMCAL). The conductive filler material is included to ensure electron conduction between the sulfur-based active material and the positive-side current collector 16.

The positive electrode 14 may include up to 90% by total weight (i.e., 90 wt %) of the sulfur-based active material, from about 5 wt % to about 20 wt % of the conductive filler material, and from about 5 wt % to about 20 wt % of the binder material. In an example, the positive electrode 14 includes about 70 wt % of the sulfur-based active material, about 15 w % of the conductive filler material, and about 15 wt % of the binder material.

The lithium sulfur electrochemical cell 12 also includes the negative electrode 18. In this example, the negative electrode 18 includes an active material, alone or in combination with any of the previously listed binder materials and/or conductive filler materials. The active material of the negative electrode 18 of the lithium sulfur electrochemical cell 12 may be lithium, silicon, graphite, tin, or antimony based material.

One example of a lithium-based active material is lithium titanate. Lithium foil may also be used, and this example of the negative electrode 18 may not include the binder material or the conductive filler material.

The silicon-based active material may be any silicon-based lithium host material that can sufficiently undergo lithium alloying and dealloying with copper or another current collector 20 functioning as the negative terminal. Examples of the silicon-based active material include crystalline silicon, amorphous silicon, silicon oxide ($SiO_x$), silicon alloys (e.g., Si—Sn), etc. The silicon active material may be in the form of a powder, particles, etc. ranging from nano-size to micro-size.

Graphite exhibits favorable lithium intercalation and deintercalation characteristics, is relatively non-reactive, and can store lithium in quantities that produce a relatively high energy density. Commercial forms of graphite that may be used to fabricate the negative electrode 18' are available from, for example, Timcal Graphite & Carbon (Bodio, Switzerland), Lonza Group (Basel, Switzerland), or Superior Graphite (Chicago, Ill.).

The tin-based active material may be any tin-based lithium host material that can sufficiently undergo lithium alloying and dealloying with copper or another current collector 20 functioning as the negative terminal. Examples of the tin-based active material include metallic tin, tin alloys (e.g., Li—Sn), etc. The tin active material may be in the form of a powder, particles, etc. ranging from nano-size to micro-size.

The antimony-based active material may be any antimony-based lithium host material that can sufficiently undergo lithium alloying and dealloying with copper or another current collector 20 functioning as the negative terminal. Examples of the antimony-based active material include metallic antimony, antimony alloys (e.g., Fe—Sn, Fe—Sn—C, Cu—Sn, $CoSb_3$), etc. The antimony active material may be in the form of a powder, particles, etc. ranging from nano-size to micro-size.

When the negative electrode 18 includes any of the silicon, graphite, tin, or antimony-based active materials, it is to be understood that the material may be alloyed with lithium or the negative electrode 18 may be pre-lithiated using a half cell method or any other suitable pre-lithiation method.

The lithium sulfur electrochemical cell 12 also includes a porous polymer separator 22 (also referred to herein as a porous separator 22) positioned between the positive and negative electrodes 14, 18. The porous polymer separator 22 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 22 include single layer polypropylene membranes, such as CELGARD 2400 and CELGARD 2500 from Celgard, LLC (Charlotte, N.C.). It is to be understood that the porous separator 22 may be coated or treated, or uncoated or untreated. For example, the porous separator 22 may or may not be coated or include any surfactant treatment thereon.

In other examples, the porous separator 22 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator 22 is poly(p-hydroxybenzoic acid). In yet another example, the porous separator 22 may be chosen from a combination of the polyolefin (such as PE and/or PP) and one or more of the other polymers listed above.

The porous separator 22 may be a single layer or may be a multi-layer (e.g., bilayer, trilayer, etc.) laminate fabricated from either a dry or wet process.

The porous separator 22 operates as an electrical insulator (preventing the occurrence of a short), a mechanical support, and a barrier to prevent physical contact between the two electrodes 14, 18. The porous separator 22 also ensures passage of lithium ions (identified by the $Li^+$) through the electrolyte solution 24 (including the organo-polysulfide additive 26 or the fluorinated organo-polysulfide additive 26') filling its pores.

The electrolyte solution 24 of the lithium sulfur electrochemical cell 12 includes the organo-polysulfide additive 26 or the fluorinated organo-polysulfide additive 26', an ether based solvent, and a lithium salt dissolved in the ether based solvent. Examples of the ether based solvent include 1,3-dioxolane (DOL), 1,2-dimethoxyethane (DME), tetrahydrofuran (THF), 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof. One example of a mixture includes 1,3-dioxolane and 1,2-dimethoxyethane. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiNO_3$, $LiPF_3(CF_3)_3$, $LiSO_3CF_3$, and mixtures thereof. In an example, the concentration of the salt in the electrolyte solution 24 is about 1 mol/L.

The electrolyte solution 24 for the lithium sulfur electrochemical cell 12 may also include other additives, such as $LiNO_3$ (in addition to another lithium salt) and/or a fluorinated ether. When included, the fluorinated ether may be Bis(2,2,2-trifluoroethyl) ether ($F_3C$—$CH_2$—O—$CH_2$—$CF_3$) and/or Propyl 1,1,2,2-tetrafluoroethyl ether ($H_7C_3$—O—$CF_2$—$CHF_2$). The concentration of the fluorinated ether in the electrolyte solution 24 ranges from about 0.1 M to about 1 M.

The lithium sulfur electrochemical cell 12 also includes an external circuit 28 and a load 30. The application of the load 30 to the lithium sulfur electrochemical cell 12 closes the external circuit 28 and connects the negative electrode 18 and the positive electrode 14. The closed external circuit 28 enables a working voltage to be applied across the lithium sulfur electrochemical cell 12. When lithiated, the negative electrode 18 contains a sufficiently higher relative quantity of alloyed lithium and can generate a beneficial electric current by way of reversible electrochemical reactions that occur when the external circuit 28 is closed. The working voltage during this discharge cycle ranges from greater than 0V to about 3V. In an example, the working voltage ranges from about 1.7V to about 2.7V. The load 30 is applied for a time sufficient to form the SEI layer 10. In an example, the load 30 is applied for the amount of time that it takes for the lithium sulfur electrochemical cell 12 to discharge (i.e., fall below a workable level of lithium in the negative electrode 18).

During the discharge cycle, the organo-polysulfide additive 26 or the fluorinated organo-polysulfide additive 26' self-assembles and deposits on the exposed surface(s) 15 of the positive electrode 14 to form an example of the SEI layer 10. Without being bound to any theory, is believed that in this example, the sulfur atoms of the additive 26 or 26' bond to carbon atoms in the positive electrode 14. When the organo-polysulfide additive 26 is utilized and includes the unsaturated chain, the 3-(Trimethoxysilyl)-1-propyl group, or the 4-nitrophenyl group, polymerization of the functional groups may also take place. When the fluorinated organo-polysulfide additive 26' is utilized, polymerization of the R and/or R' functional groups may also take place. In these examples, the SEI layer 10 includes a polymer layer. The SEI layer 10 may have a thickness of about 10 nm or less.

During the discharge cycle, several other chemical processes also take place within the lithium sulfur electrochemical cell 12. Examples of these other chemical processes include lithium ($Li^+$) dissolution from the surface of the negative electrode 18 and incorporation of the lithium cations into alkali metal polysulfide salts (e.g., $Li_2S_x$, such as $Li_2S_8$, $Li_2S_6$, $Li_2S_4$, $Li_2S_3$, $Li_2S_2$, and $Li_2S$) in the positive electrode 14. As such, polysulfides are formed (sulfur is reduced) on the surface of the positive electrode 14 in sequence while the lithium sulfur electrochemical cell 12 is discharging. The chemical potential difference between the positive electrode 14 and the negative electrode 18 drives electrons ($e^-$) produced by the dissolution of lithium at the negative electrode 18 through the external circuit 28 towards the positive electrode 14. The resulting electric current passing through the external circuit 28 can be harnessed and directed through the load 30 until the lithium in the negative electrode 18 falls below a workable level.

It is to be understood that a single discharge cycle will generate the SEI layer 10. In subsequent cycles, the SEI layer 10 keeps the positive electrode active material (e.g., sulfur-carbon composite) from coming into contact with the remaining electrolyte solution, and thus reduces or prevents undesirable internal chemical reactions from taking place that can consume the electrolyte solution 24.

When lithium is used as the negative electrode 18 in the lithium sulfur electrochemical cell 12, elemental lithium or a compound thereof (e.g., lithium titanate) is used as the negative electrode 18. Due to its high reactivity, the lithium in the negative electrode 18 reacts immediately with the electrolyte solution 24 (i.e., without application of a voltage or load). This reaction may decompose at least some component (other than the additive 26 or the fluorinated additive 26') in the electrolyte solution 24, and the decomposition product deposits on the exposed surface(s) of the negative electrode 18 to form another SEI layer (not shown in FIG. 1). This SEI layer will prevent further contact or reaction between the negative electrode 18 and the electrolyte solution 24. As such, within the working voltage range, the additive 26 or 26' reacts with the positive electrode 14 rather than the negative electrode 18.

Lithium Ion Electrochemical Cell (Lithium Ion Battery)

Figure 2:
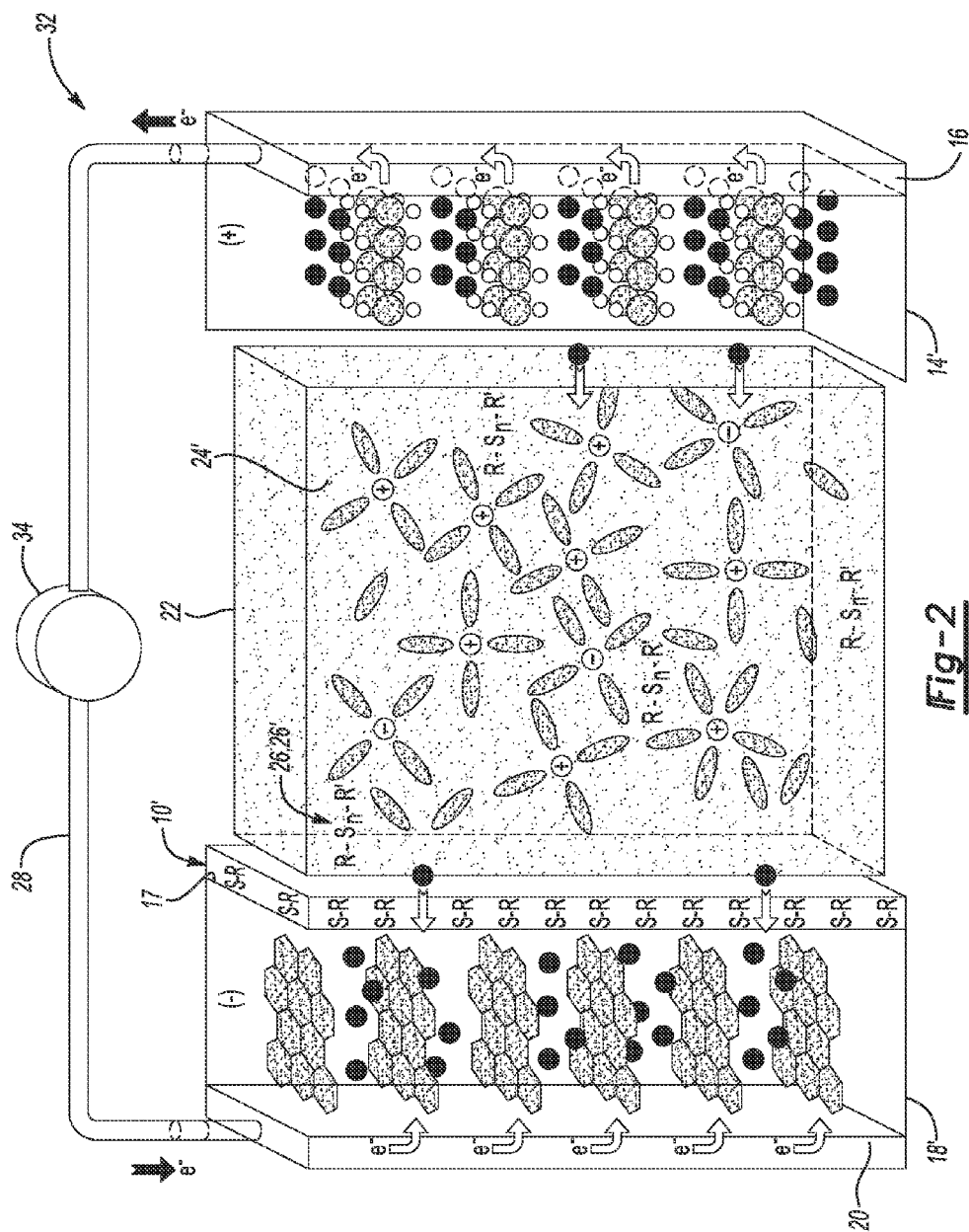
FIG. 2 is a schematic, perspective view of an example of a lithium ion battery showing a charging state and formation of an SEI on a negative electrode surface.

In the lithium ion electrochemical cell or battery, the SEI layer forms on the negative electrode surface during the charge cycle. An example of the lithium ion electrochemical cell 32 during the charge cycle is shown in FIG. 2.

The lithium ion electrochemical cell 32 includes the positive electrode 14'. The positive electrode 14' includes any lithium-based active material that can sufficiently undergo lithium insertion and deinsertion while aluminum or another suitable current collector 16 is functioning as the positive terminal of the lithium ion electrochemical cell 32. One common class of known lithium-based active materials suitable for the positive electrode 14' includes layered lithium transition metal oxides. For example, the lithium-based active material may be spinel lithium manganese oxide ($LiMn_2O_4$), lithium cobalt oxide ($LiCoO_2$), a manganese-nickel oxide spinel [$Li(Mn_{1.5}Ni_{0.5})O_2$], a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable lithium-based active materials include $Li(Ni_{1/3}Mn_{1/3}Co_{1/3})O_2$, $Li_{x+y}Mn_{2-y}O_4$ (LMO, 0<x<1 and 0<y<0.1), or a lithium iron polyanion oxide, such as lithium iron phosphate (LiFePO4) or lithium iron fluorophosphate ($Li_2FePO_4F$), or a lithium rich layer-structure. Still other lithium based active materials may also be utilized, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The positive electrode 14' may also include any of the binder materials and/or conductive filler materials previously described.

The lithium ion electrochemical cell 32 also includes the negative electrode 18'. In this example, the negative electrode 18' includes an active material, alone or in combination with any of the previously listed binder materials and/or conductive filler materials. The negative electrode 18' may include any lithium host active material that can sufficiently undergo lithium intercalation and deintercalation while copper or another current collector 20 functions as the negative terminal of the lithium ion electrochemical cell 32. Examples of the lithium host active material include graphite, a silicon-based material, a tin-based material, or an antimony-based material. Any of the previously described graphite, silicon-based materials, tin-based material, or antimony-based materials may be used. The negative electrode 18' formed of any of these materials should be lithiated or alloyed with lithium.

The lithium ion electrochemical cell 32 also includes the porous polymer separator 22 positioned between the positive and negative electrodes 14', 18'. Any of the examples of the porous polymer separator 22 described herein may be used in the lithium ion electrochemical cell 32. In the lithium ion electrochemical cell 32, the porous separator 22 operates as an electrical insulator (preventing the occurrence of a short), a mechanical support, and a barrier to prevent physical contact between the two electrodes 14', 18'. The porous separator 22 also ensures passage of lithium ions (identified by the black dots and by the open circles having a (+) charge) through the electrolyte solution 24' (including the organo-polysulfide additive 26 or the fluorinated organo-polysulfide additive 26') filling its pores.

The electrolyte solution 24' of the lithium ion electrochemical cell 32 includes the organo-polysulfide additive 26 or the fluorinated organo-polysulfide additive 26', an organic solvent, and a lithium salt dissolved in the organic based solvent. Examples of the organic solvent include cyclic carbonates (ethylene carbonate (EC), propylene carbonate, butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof. In an example, the electrolyte solution 24' is a mixture of ethylene carbonate, dimethyl carbonate, and diethyl carbonate. Any of the previously mentioned salts may be used in the electrolyte solution 24'. In an example, the concentration of the salt in the electrolyte solution 24' is about 1 mol/L. $LiNO_3$ may also be added to the electrolyte solution 24' as another additive, in addition to the organo-polysulfide additive 26 or the fluorinated organo-polysulfide additive 26' and the lithium salt. In these instances, the concentration of the lithium salt may be about 0.6 mol/L plus the $LiNO_3$ additive.

The lithium ion electrochemical cell 32 also includes the external circuit 28. In this example, an external charger 34 may be connected to the positive and negative electrodes 14', 18' to close the external circuit 28. The charger 34 and closed external circuit 28 enable a working voltage to be applied across the lithium ion electrochemical cell 32. The working voltage during this charge cycle ranges from greater than 2 V to about 5 V. In an example, the working voltage ranges from about 2.7 V to about 4.2 V.

During the charge cycle, the applied voltage extracts intercalated lithium from the positive electrode 14'. The extracted lithium atoms are split into lithium ions (identified by the black dots and by the open circles having a (+) charge) and electrons ($e^-$) as they leave an intercalation host at the positive electrode-electrolyte interface. The potential difference between the positive electrode 14' and the negative electrode 18' drives the electron ($e^-$) flow toward the negative electrode 18' through the external circuit 28. Lithium ions are concurrently carried by the electrolyte solution 24' across the porous separator 22 towards the negative electrode 18'. The electrons ($e^-$) and the lithium ions are reunited at the negative electrode 18', thus replenishing it with intercalated lithium for consumption during a next battery discharge cycle.

The voltage through the external charger 34 is applied for a time sufficient to form the SEI layer 10. In an example, the voltage is applied for the amount of time that it takes for the lithium ion electrochemical cell 32 to charge. In an example in which the graphite negative electrode 18' with a current density of 0.1 C is used, the voltage may be applied for about 10 hours.

During the charge cycle, the organo-polysulfide additive 26 or the fluorinated organo-polysulfide additive 26' self-assembles and deposits on the exposed surface(s) 17 of the negative electrode 18' to form an example of the SEI layer 10'. Without being bound to any theory, is believed that in this example, the sulfur atoms of the additive 26 or the fluorinated additive 26' bond to carbon atoms in the graphite negative electrode 18' or silicon atoms in the silicon negative electrode 18'. When the organo-polysulfide additive 26 is utilized and includes the unsaturated chain, the 3-(Trimethoxysilyl)-1-propyl group, or the 4-nitrophenyl group, polymerization of the functional groups may also take place. When the fluorinated organo-polysulfide additive 26' is utilized, polymerization of the functional groups may also take place. In these examples, the SEI layer 10' includes a polymer layer. The SEI layer 10' may have a thickness of about 10 nm or less.

It is to be understood that a single charge cycle will generate the SEI layer 10'. In subsequent cycles, the SEI layer 10' keeps the negative electrode active material (e.g., graphite, silicon) from coming into contact with the remaining electrolyte solution 24', and thus reduces or prevents undesirable internal chemical reactions from taking place that can consume the electrolyte solution 24'.

As mentioned above, the reaction of the additive(s) 26 or the fluorinated additive(s) 26' with the electrode surface happens in a reducing environment. During the charge process of the lithium ion battery 32, the negative electrode 18' alone has the reducing environment (i.e., the electrons flow to the negative electrode 18' from the positive electrode 14' through the external circuit 28). Under these conditions, the additive(s) 26 or the fluorinated additive(s) 26' do not react on the surface of positive electrode 14'. Furthermore, in this particular example, once the lithium ion battery 32 undergoes a discharge cycle, it is believed that although the electrons flow to the positive electrode 14', the reaction may not happen because the absolute voltage (vs. $Li/Li^+$) of the positive electrode 14' is too high.

Electrochemical Half Cells

Rather than being formed in the lithium ion electrochemical cell 32, the SEI layer may be formed on a graphite electrode or a silicon electrode using a half cell. In these examples of the half cell, the graphite or silicon electrode to be coated is a working electrode (functioning as a cathode in the half cell) and a voltage is applied versus a counter/reference electrode (functioning as the anode in the half cell).

The graphite working electrode may be formed of graphite and any of the binders and/or the conductive fillers previously described. The silicon working electrode may be formed of any of the silicon-based active materials, the binders and/or the conductive fillers previously described. The counter/reference electrode is formed of lithium (e.g., lithium foil, lithium titanate, etc.).

Both the working electrode and the counter/reference electrode are exposed to the electrolyte solution that is suitable for the lithium ion electrochemical cell 32. An external circuit connects the working electrode and the counter/reference electrode. The voltage that is applied to the Li-graphite or Li—Si half cell ranges from greater than 0 V to about 2 V. The voltage is applied for a time sufficient to form the SEI layer on the graphite or silicon working electrode. In an example, the voltage is applied for the amount of time that it takes for the lithium metal counter/reference electrode to discharge (i.e., fall below a workable level).

During the discharge cycle, the organo-polysulfide additive or the fluorinated organo-polysulfide additive self-assembles and deposits on the exposed surface(s) of the graphite or silicon working electrode to form an example of the SEI layer. Without being bound to any theory, is believed that in this example, the sulfur atoms of the additive bond to carbon atoms in the graphite working electrode or silicon atoms in the silicon working electrode. When the organo-polysulfide additive is utilized and includes the unsaturated chain, the 3-(Trimethoxysilyl)-1-propyl group, or the 4-nitrophenyl group, polymerization of the functional groups may also take place. When the fluorinated organo-polysulfide additive is utilized, polymerization of the functional groups may also take place. In these examples, the SEI layer includes a polymer layer. The SEI layer may have a thickness of about 10 nm or less.

During this example of the discharge cycle, other chemical processes also take place within the half cell. For example, lithium ions are dissolved (or de-plated) from the lithium metal counter/reference electrode and are alloyed with the graphite or the silicon by an electroformation reaction with the electrolyte solution (which can conduct the lithium ions). More particularly, the lithium ions can alloy with the graphite active material or the silicon-based active material, thereby lithiating the graphite working electrode or the silicon working electrode.

When formation of the SEI layer is complete, the lithiated graphite or silicon working electrode having the SEI layer formed thereon may be rinsed to remove any remaining electrolyte solution. These coated electrodes may be used as negative electrodes in the lithium sulfur battery or the lithium ion battery.

Lithium Lithium Electrochemical Cells (Lithium Lithium Battery)

The SEI layer may be formed on a lithium electrode in a cell that includes both a lithium working electrode (functioning as the cathode) and a lithium counter electrode (functioning as the anode) separated by a separator. In these examples, a voltage is applied versus the counter/reference electrode.

Both the lithium working electrode and the lithium counter/reference electrode may be formed of lithium (e.g., lithium foil, lithium titanate, etc.). Both the lithium working electrode and the lithium counter/reference electrode are also exposed to the electrolyte solution including the organo-polysulfide additive or the fluorinated organo-polysulfide additive. In this example, either the electrolyte solution used in the lithium sulfur electrochemical cell 12 or the electrolyte solution used in the lithium ion electrochemical cell 32 may be used.

Due to its high reactivity, the lithium electrodes in the Li—Li cell react immediately with the electrolyte solution (i.e., without application of a voltage or load). A lower potential may be applied on the lithium working electrode to force the reaction to happen between the working electrode and the additive. In an example, the discharge cycle is applied with a certain current passing through the Li—Li cell (e.g., 1 mA). In an example Li—Li cell, the voltage of the Li working electrode is around −10 mV (−0.01 V) (noting that the voltage is dependent on the additive used), which provides enough energy to push the reaction to happen at the working electrode surface. This process deposits some amount of Li metal on the working electrode. In an example, the voltage may be switched so that the charge is then directed back to the counter electrode (which has a cutoff voltage of +2 V). It is to be understood that since the working electrode in this example is already Li, the removal of the extra deposited Li is not necessary for the electrode to be used as the negative electrode in the lithium sulfur battery 12 or the lithium ion battery 32.

During the discharge cycle, the organo-polysulfide additive or the fluorinated organo-polysulfide additive self-assembles and deposits on the exposed surface(s) of the lithium working electrode to form an example of the SEI layer. Without being bound to any theory, is believed that in this example, the sulfur atoms of the additive bond to lithium atoms in the lithium working electrode. When the organo-polysulfide additive is utilized and includes the unsaturated chain, the 3-(Trimethoxysilyl)-1-propyl group, or the 4-nitrophenyl group, polymerization of the functional groups may also take place. When the fluorinated organo-polysulfide additive is utilized, polymerization of the functional groups may also take place. In these examples, the SEI layer includes a polymer layer. The SEI layer may have a thickness of about 10 nm or less.

During this example of the discharge cycle, other chemical processes also take place within the Li—Li cell. For example, lithium ions are dissolved (or de-plated) from the lithium metal counter/reference electrode and are plated on the lithium working electrode by an electroformation reaction with the electrolyte solution (which can conduct the lithium ions).

When formation of the SEI layer is complete, the lithium working electrode having the SEI layer formed thereon may be rinsed to remove any remaining electrolyte solution. This coated electrode may be used as a negative electrode in the lithium sulfur battery 12 or the lithium ion battery 32.

The examples of the SEI layer 10, 10' disclosed herein have several advantages. First, the SEI layer 10, 10' keeps the positive electrode active material (e.g., sulfur-carbon composite) or the negative electrode active material (e.g., lithium, silicon, or graphite) from coming into contact with the electrolyte solution in the battery. In theory, this SEI layer covers the electrode surface and blocks electrons from diffusing out of the electrode, which would otherwise inevitably consume the electrolyte by electrochemical reduction. As such, the SEI layer 10, 10' reduces or prevents undesirable internal chemical reactions from taking place, and thus also reduces or prevents self-discharge. Self-discharge results when internal chemical reactions take place in the battery, even when no connection is made between the positive and negative electrodes. These reactions can reduce the stored charge of the battery. Second, the SEI layer is also ionically conducting, and thus allows lithium ions to travel across the layer. Third, because the SEI layer is an organic-based protection layer, it exhibits more flexibility when compared, for example, to ceramic or other rigid electrode coating layers. Overall, the SEI layer should contribute to good cycling of the battery.

To further illustrate the present disclosure, examples are given herein. It is to be understood that these examples are provided for illustrative purposes and are not to be construed as limiting the scope of the present disclosure.

Example 1

A comparative electrolyte was prepared with 1M $LiPF_6$ in ethylene carbonate, ethylmethyl carbonate, and dimethyl carbonate (1:1:1 v/v/v). An example electrolyte was prepared with 1M $LiPF_6$ in ethylene carbonate, ethylmethyl carbonate, and dimethyl carbonate (1:1:1) and 0.5 vol % of R—$S_2$—R (where R was 3-(trimethoxysilyl-1-propyl)).

A comparative coin cell (1) was prepared with a graphite electrode as a working electrode, Li metal as the counter electrode, and the comparative electrolyte solution.

An example coin cell (2) was prepared with a graphite electrode as a working electrode, Li metal as the counter electrode, and the example electrolyte solution.

Figure 3:
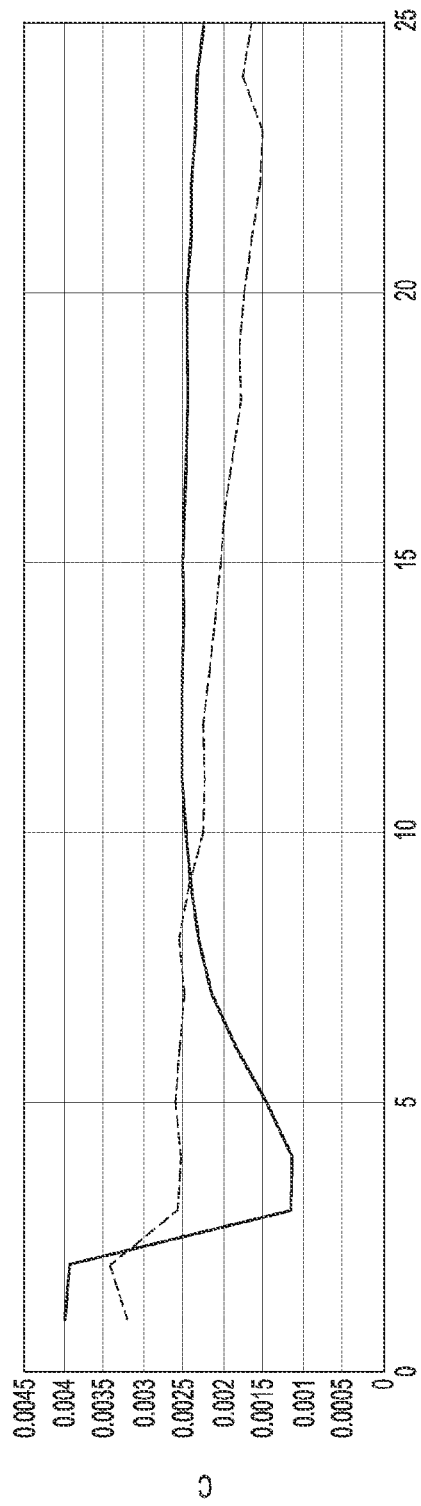
FIG. 3 is a graph illustrating the capacity (Ah, Y-axis) vs. cycle number for coin cells with graphite working electrodes in a comparative electrolyte solution and an example electrolyte solution having an organo-polysulfide additive therein.

The comparative and example coin cells 1 and 2 were cycled with a cut-off voltage between 0.05 V and 1.5 V vs. Li/Li+. The discharge capacity results are shown in FIG. 3. In FIG. 3, the Y axis, labeled "C," represents the capacity (Ah), and the X axis, labeled "#," represents the cycle number. As illustrated in FIG. 3, after several cycles, the discharge capacity of the example coin cell 2 with the organo-polysulfide additive was higher than the discharge capacity of the comparative coin cell 1. As such, example coin cell 2 with the organo-polysulfide additive exhibited improved stability.

Figure 4:
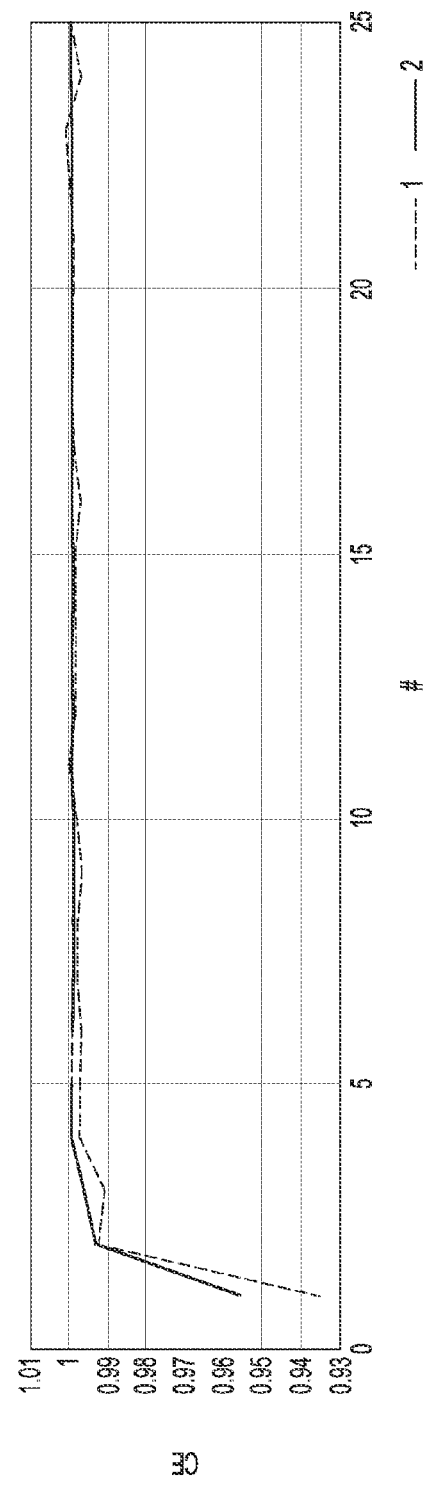
FIG. 4 is a graph illustrating the Coulombic efficiency (Y-axis) vs. cycle number for the coin cells with the graphite working electrodes in the comparative electrolyte solution and the example electrolyte solution having an organo-polysulfide additive therein.

The Coulombic efficiency results are shown in FIG. 4. In FIG. 4, the Y axis, labeled CE, represents the coulombic efficiency (numbers multiplied by 100 to obtain the percentage) and the X axis, labeled "#," represents the cycle number. As illustrated in FIG. 4, throughout the cycles, the Coulombic efficiency of the example coin cell 2 with the organo-polysulfide additive was as good as or slightly higher than the Coulombic efficiency of the comparative coin cell 1.

These results indicate that the organo-polysulfide additive improves the electrochemical cell performance by forming an SEI layer during discharge.

Example 2

A comparative electrolyte was prepared with 1M LiTFSI in 1,3-dioxolane and 1,2-dimethoxyethane (1:1 v/v). A first example electrolyte was prepared with 0.4M LiTFSI/0.6M LiNO$_3$ in 1,3-dioxolane and 1,2-dimethoxyethane (1:1 v/v) and 20 vol % of Me-S$_2$-Me (where Me was a methyl group). A second example electrolyte was prepared with 0.4M LiTFSI/0.6M LiNO$_3$ in 1,3-dioxolane and 1,2-dimethoxyethane (1:1 v/v) and 0.5 vol % of R—S$_2$—R (where R was 3-(trimethoxysilyl-1-propyl)).

A comparative coin cell (3) was prepared with Li metal as a working electrode, Li metal as the counter electrode, and the comparative electrolyte solution.

An example coin cell (4) was prepared with Li metal as a working electrode, Li metal as the counter electrode, and the first example electrolyte solution.

Another example coin cell (5) was prepared with Li metal as a working electrode, Li metal as the counter electrode, and the second example electrolyte solution.

The comparative and two example coin cells 3, 4, and 5 were cycled with a constant current with a cut-off voltage between −1 V and 2 V vs. Li/Li+. The Coulombic efficiency results are shown in FIG. 5A. In FIG. 5A, the Y axis, labeled CE, represents the Coulombic efficiency (numbers multiplied by 100 to obtain the percentage) and the X axis, labeled "#," represents the cycle number. As illustrated in FIG. 5A, the Coulombic efficiency of the example coin cells 4 and 5, each prepared with an example of the organo-polysulfide additive, was higher than the Coulombic efficiency of the comparative coin cell 3. FIG. 5B illustrates the Coulombic efficiency between 0.95 and 0.99 for the examples coin cells 4 and 5. Both examples exhibited high efficiency, but example coin cell 5, which included an additive that polymerizes, exhibited improved stability.

These results indicate that the organo-polysulfide additive improves the electrochemical cell performance by forming an SEI layer during discharge.

Example 3

A comparative electrolyte was prepared with 1,3-dioxolane and 1,2-dimethoxyethane (1:1 v/v), 0.6 M LiNO$_3$, and 0.4M LiTFSI. An example electrolyte was prepared with 1,3-dioxolane and 1,2-dimethoxyethane (1:1 v/v), 0.6 M LiNO$_3$, 0.4M LiTFSI, and 0.5 vol % of R—S$_2$—R (where R was methyl groups).

The comparative electrolyte and the example electrolyte were used in respective Li—S batteries (i.e., comparative Li—S battery 6 and example Li—S battery 7), including a Li metal negative electrode and a sulfur-carbon composite positive electrode.

A load was applied to initiate a discharge cycle.

Figure 6:
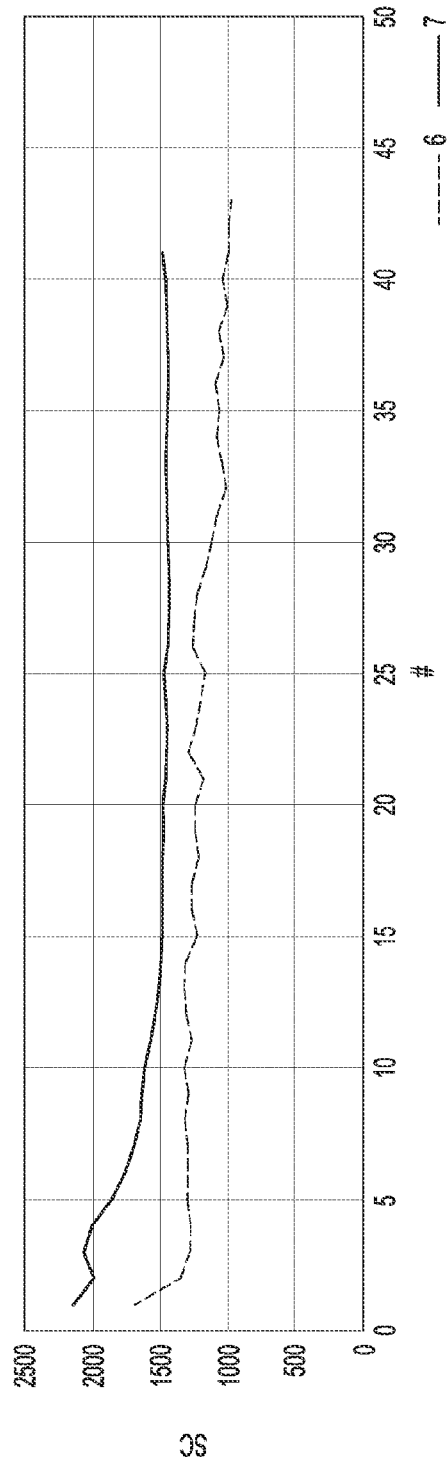
FIG. 6 is a graph illustrating the specific capacity (mAh/g, Y-axis) vs. cycle number for Li—S electrochemical cells with a comparative electrolyte solution and an example electrolyte solution having an organo-polysulfide additive therein.

The specific discharge capacity results are shown in FIG. 6. In FIG. 6, the Y axis, labeled "SC," represents the specific capacity (mAh/g), and the X axis, labeled "#," represents the cycle number. As illustrated in FIG. 6, the specific discharge capacity of the example Li—S battery 7 with the organo-polysulfide additive was higher than the specific discharge capacity of the comparative Li—S battery 6. As such, example Li—S battery 7 with the organo-polysulfide additive exhibited improved stability.

Figure 7:
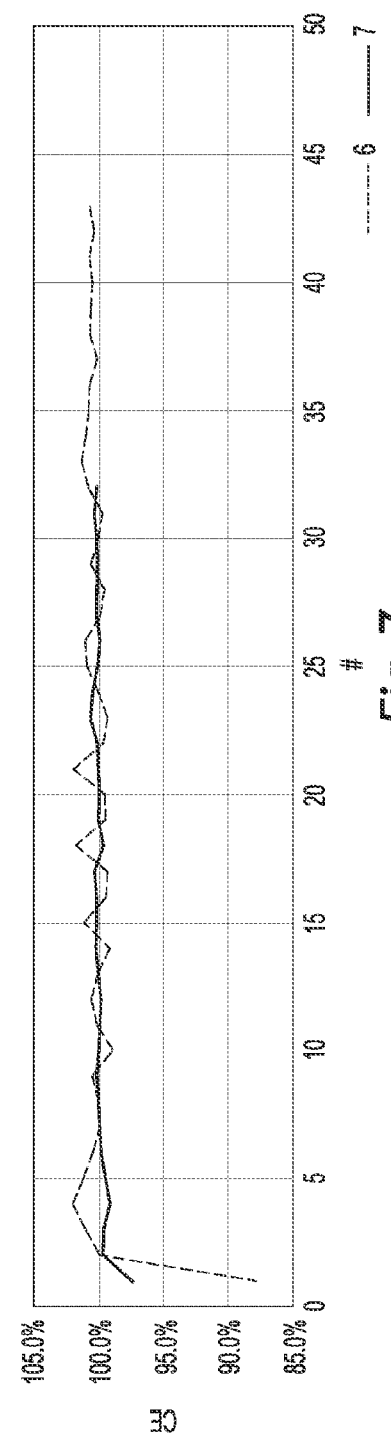
FIG. 7 is a graph illustrating the Coulombic efficiency (Y-axis) vs. cycle number for the Li—S electrochemical cells with the comparative electrolyte solution and the example electrolyte solution having an organo-polysulfide additive therein.

The Coulombic efficiency results are shown in FIG. 7. In FIG. 7, the Y axis, labeled CE, represents the Coulombic efficiency and the X axis, labeled "#," represents the cycle number. As illustrated in FIG. 7, throughout the cycles, the Coulombic efficiency of the example Li—S battery 7 with the organo-polysulfide additive was stable, and did not exhibit the overcharge that was exhibited by the comparative Li—S battery 6.

Example 4

A comparative electrolyte was prepared with 1,3-dioxolane and 1,2-dimethoxyethane (1:1 v/v) and 1M LiTFSI. An example electrolyte was prepared with 1,3-dioxolane and 1,2-dimethoxyethane (1:1 v/v), 0.6 M LiNO$_3$, 0.4M LiTFSI, and 1 vol % of CF$_3$S$_2$CF$_3$.

The comparative electrolyte and the example electrolyte were used in respective Li—S batteries (i.e., example Li—S battery 8 and comparative Li—S battery 9), including a Li metal negative electrode and a sulfur-carbon composite positive electrode.

A load was applied to initiate a discharge cycle.

Figure 8:
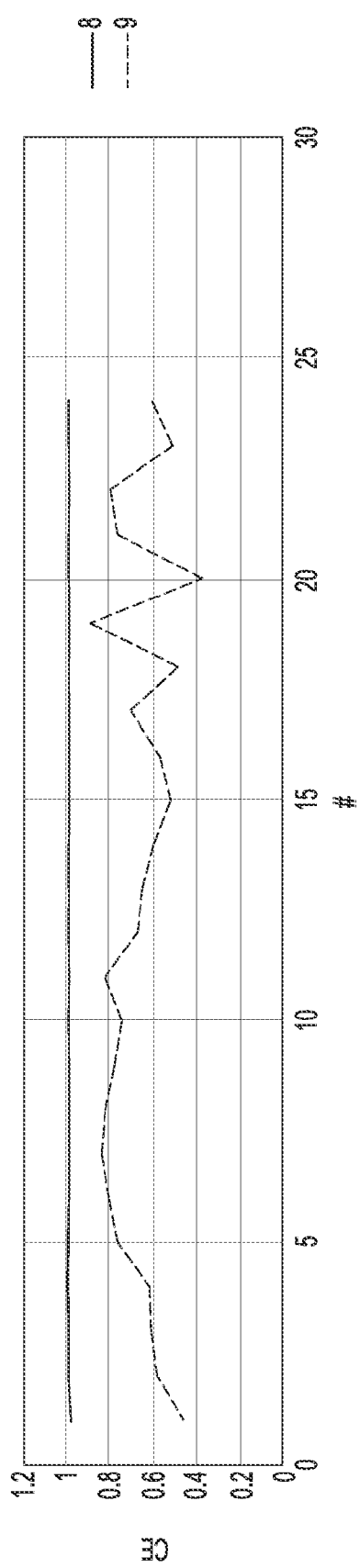
FIG. 8 is a graph illustrating the Coulombic efficiency (Y-axis) vs. cycle number for Li—S electrochemical cells with a comparative electrolyte solution and an example electrolyte solution having a fluorinated organo-polysulfide additive therein.

The Coulombic efficiency results are shown in FIG. 8. In FIG. 8, the Y axis, labeled CE, represents the Coulombic efficiency (multiply by 100 to obtain the percentage) and the X axis, labeled "#," represents the cycle number. As illustrated in FIG. 8, throughout the cycles, the Coulombic efficiency of the example Li—S battery 8 with the fluorinated organo-polysulfide additive was more stable than comparative Li—S battery 9, and did not exhibit any overcharge.

Example 5

A comparative electrolyte was prepared with 1,3-dioxolane and 1,2-dimethoxyethane (1:1 v/v) 0.6 M LiNO$_3$, and 0.4M LiTFSI. An example electrolyte was prepared with 1,3-dioxolane and 1,2-dimethoxyethane (1:1 v/v), 0.6 M LiNO$_3$, 0.4M LiTFSI, and 1 vol % of CF$_3$S$_2$CF$_3$.

The comparative electrolyte and the example electrolyte were used in respective Li—S batteries (i.e., example Li—S battery 10 and comparative Li—S battery 11), including a Li metal negative electrode and a sulfur-carbon composite positive electrode.

A load was applied to initiate a discharge cycle.

Figure 9:
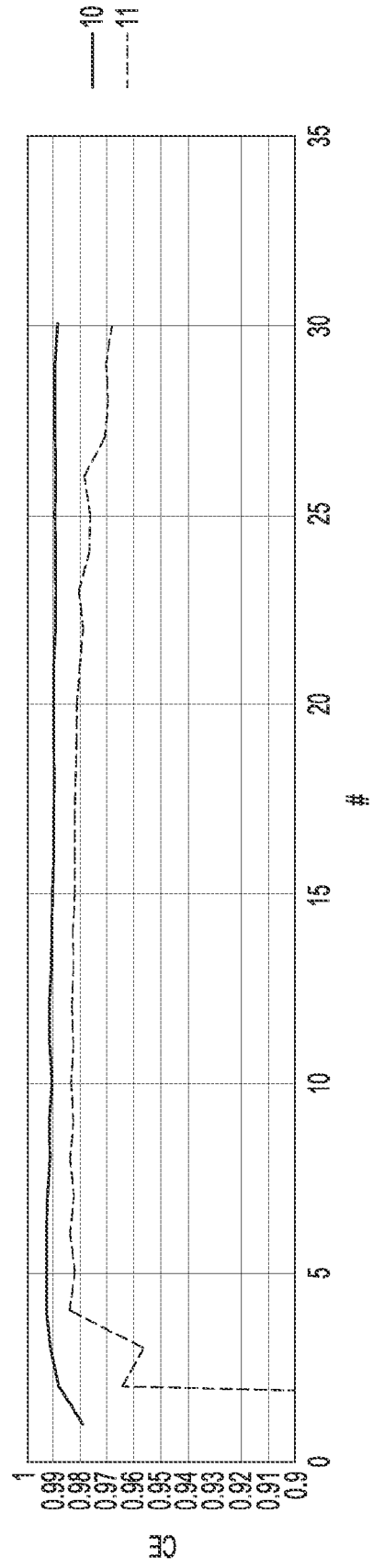
FIG. 9 is a graph illustrating the Coulombic efficiency (Y-axis) vs. cycle number for Li—S electrochemical cells with another comparative electrolyte solution and another example electrolyte solution having a fluorinated organo-polysulfide additive therein.

The Coulombic efficiency results are shown in FIG. 9. In FIG. 9, the Y axis, labeled CE, represents the Coulombic efficiency (multiply by 100 to obtain the percentage) and the X axis, labeled "#," represents the cycle number. As illustrated in FIG. 9, throughout the cycles, the Coulombic efficiency of the example Li—S battery 10 with the fluorinated organo-polysulfide additive was more stable than the comparative Li—S battery 11, and did not exhibit any overcharge.

It is to be understood that the ranges provided herein include the stated range and any value or sub-range within the stated range. For example, a range of from greater than 0 vol % to about 50 vol % should be interpreted to include not only the explicitly recited limits of from greater than 0 vol % to about 50 vol %, but also to include individual values, such as 0.75 vol %, 15 vol %, 32 vol %, 49.5 vol %, etc., and sub-ranges, such as from about 0.25 vol % to about 35 vol %; from about 2 vol % to about 25 vol %, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for making a solid electrolyte interface (SEI) layer on a surface of an electrode, the method comprising:
    exposing the electrode to an electrolyte solution in an electrochemical cell, the electrolyte solution including either i) an organo-polysulfide additive having a formula $RS_nR'$ (n≥2), wherein R and R' are independently selected from a methyl group, an unsaturated chain, a 3-(Trimethoxysilyl)-1-propyl group, or a 4-nitrophenyl group or ii) a fluorinated organo-polysulfide additive having a formula $RS_nR'$ (n≥2), wherein R and R' can be the same or different, and wherein R and R' each have a general formula of $C_xH_yF_{(2x-y+1)}$, where x is at least 1 and y ranges from 0 to 2x; and
    applying a voltage or a load to the electrochemical cell, wherein the applying of the voltage or the load causes the organo-polysulfide additive or the fluorinated organo-polysulfide additive to react to form the SEI layer.

2. The method as defined in claim 1 wherein:
the electrochemical cell is a lithium sulfur battery; and
the applying of the load initiates a discharge cycle of the lithium sulfur battery.

3. The method as defined in claim 2 wherein:
the electrode is a sulfur-carbon composite positive electrode of the lithium sulfur battery;
the lithium sulfur battery further includes a lithium negative electrode; and
a working voltage across the load ranges from greater than 0V to about 3V.

4. The method as defined in claim 3 wherein the electrolyte solution further includes:

a solvent selected from the group consisting of 1,3-dioxolane, dimethoxyethane, tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof; and a lithium salt selected from the group consisting of lithium bis(trifluoromethylsulfonyl)imide (LiN($CF_3SO_2$)$_2$ or LiTFSI), $LiNO_3$, $LiPF_6$, $LiBF_4$, LiI, LiBr, LiSCN, $LiClO_4$, $LiAlCl_4$, $LiB(C_2O_4)_2$ (LiBOB), $LiB(C_6H_5)_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiCF_3SO_3$, $LiAsF_6$, and combinations thereof.

5. The method as defined in claim 4 wherein the electrolyte solution further includes a fluorinated ether selected from the group consisting of Bis(2,2,2-trifluoroethyl) ether ($F_3C$—$CH_2$—O—$CH_2$—$CF_3$) and Propyl 1,1,2,2-tetrafluoroethyl ether ($H_7C_3$—O—$CF_2$—$CHF_2$).

6. The method as defined in claim 1 wherein:
the electrochemical cell is a lithium ion battery; and
the applying of the voltage initiates a charge cycle of the lithium ion battery.

7. The method as defined in claim 6 wherein:
the electrode is a graphite negative electrode or a silicon negative electrode of the lithium ion battery;
the lithium ion battery further includes a lithium-based positive electrode; and
the applied voltage ranges from greater than 2 V to about 5 V.

8. The method as defined in claim 7 wherein the electrolyte solution further includes:
a solvent selected from the group consisting of ethylene carbonate, dimethyl carbonate, diethyl carbonate, and a mixture of ethylene carbonate, dimethyl carbonate, diethyl carbonate; and a lithium salt selected from the group consisting of lithium bis(trifluoromethylsulfonyl)imide (LiN($CF_3SO_2$)$_2$ or LiTFSI), $LiNO_3$, $LiPF_6$, $LiBF_4$, LiI, LiBr, LiSCN, $LiClO_4$, $LiAlCl_4$, $LiB(C_2O_4)_2$ (LiBOB), $LiB(C_6H_5)_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiCF_3SO_3$, $LiAsF_6$, and combinations thereof.

9. The method as defined in claim 1 wherein:
the electrode is a graphite working electrode or a silicon working electrode;
the electrochemical cell is a half cell including a lithium reference/counter electrode; and
the applied voltage ranges from greater than 0 V to about 2 V.

10. The method as defined in claim 9, further comprising incorporating the electrode having the solid electrolyte interface (SEI) layer thereon into a lithium ion battery.

11. The method as defined in claim 1 wherein the electrolyte solution includes the organo-polysulfide, wherein the R is the unsaturated chain, the 3-(Trimethoxysilyl)-1-propyl group, or the 4-nitrophenyl group, and wherein the applying the voltage or the load occurs for a time of a charge process or discharge process of the electrochemical cell, whereby in situ polymerization of the unsaturated chain, the 3-(Trimethoxysilyl)-1-propyl group, or the 4-nitrophenyl group takes place.

12. The method as defined in claim 1 wherein the electrolyte solution includes the organo-polysulfide or the fluorinated organo-polysulfide additive in an amount ranging from greater than 0 vol % to about 50 vol % of a total vol % of the electrolyte solution.

13. The method as defined in claim 1 wherein:
the electrode is a lithium working electrode;
the electrochemical cell is a half cell including a lithium reference/counter electrode; and
the applied voltage forces a reaction between the lithium working electrode and the organo-polysulfide or the fluorinated organo-polysulfide additive to form the SEI layer.

14. The method as defined in claim 1 wherein the electrolyte solution includes the organo-polysulfide additive and the unsaturated chain is selected from the group consisting of a vinyl group and an allyl group.

15. The method as defined in claim 1 wherein the electrolyte solution includes the fluorinated organo-polysulfide and the R and R' are independently selected from the group consisting of $CF_3$, $CF_2CF_3$, and $CH_2CF_3$.

16. The method as defined in claim 1 wherein the electrolyte solution includes the fluorinated organo-polysulfide and wherein the applying the voltage or the load occurs for a time of a charge process or discharge process of the electrochemical cell, whereby in situ polymerization of any of R or R' takes place.

* * * * *